United States Patent [19]

Okamoto et al.

[11] Patent Number: 4,659,757
[45] Date of Patent: Apr. 21, 1987

[54] POLYESTER RESIN COMPOSITION FOR FORMING AN IMPACT RESISTANT ARTICLE

[75] Inventors: Takashi Okamoto, Osaka; Fumio Ohama, Kyoto, both of Japan

[73] Assignee: Unitika Ltd., Japan

[21] Appl. No.: 836,862

[22] Filed: Mar. 7, 1986

[30] Foreign Application Priority Data

Mar. 8, 1985 [JP] Japan .................................. 60-47008
Apr. 5, 1985 [JP] Japan .................................. 60-73277
Jun. 11, 1985 [JP] Japan .................................. 60-126641

[51] Int. Cl.$^4$ ............................................. C08L 67/02
[52] U.S. Cl. .................................... 523/436; 523/437; 523/438; 524/513
[58] Field of Search ....................... 523/436, 437, 438; 524/513

[56] References Cited

U.S. PATENT DOCUMENTS 4,284,540  8/1981  Iida et al. ............................ 524/513
4,366,273 12/1982  Aharoni .............................. 524/513

FOREIGN PATENT DOCUMENTS 57-34152  2/1982  Japan ................................. 524/513
57-55955  4/1982  Japan ................................. 524/513
2075031  11/1981  United Kingdom ................. 524/513

Primary Examiner—Lewis T. Jacobs
Attorney, Agent, or Firm—Sughrue, Mion, Zinn, Macpeak, and Seas

[57] ABSTRACT

A polyester resin composition for forming an impact resistant article is described, comprising from 40 to 97 parts by weight of polyethylene terephthalate and from 3 to 60 parts by weight of at least one polyester selected from (1) an ethylene terephthalate-based polyester comprising from 5 to 25 wt % of at least one dibasic acid represented by formula (I)

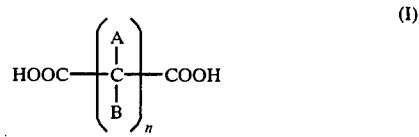

wherein A and B each represents a hydrogen atom, an alkyl group, or a phenyl group, and n is an integer of not less than 10, and ester bond-forming derivatives, (2) an ethylene terephthalate-based polyester comprising 3 to 25 wt % of at least one polyalkylene glycol having a molecular weight of from about 500 to 20,000, and (3) polyarylate, which composition further contains, per 100 parts by weight of the polyester, (a) from 0.05 to 10 parts by weight of at least one of an inorganic crystal nucleating agent having an average particle diameter of not more than 50 μm, an organic compound containing a metal salt of a carboxyl group, and a polymer compound containing a metal salt of a carboxyl group, (b) from 3 to 30 parts by weight of modified polyolefin or modified olefin-based elastomer prepared by adding from 0.001 to 10 mol % of an alicyclic carboxylic acid containing a cis-double bond in the ring or its functional derivative to a polyolefin or olefin-based elastomer, (c) from 1 to 30 parts by weight of a copolymer comprising from 80 to 99 wt % of α-olefin, from 1 to 20 wt % of glycidyl methacrylate or glycidyl acrylate, and up to 19 wt % of vinyl acetate, (d) from 0.3 to 10 parts by weight of an ester-based plasticizer, and (e) up to 150 parts by weight of a fibrous reinforcing material.

18 Claims, No Drawings

POLYESTER RESIN COMPOSITION FOR FORMING AN IMPACT RESISTANT ARTICLE

BACKGROUND OF THE INVENTION

The present invention relates to a polyester resin composition which is good in moldability and provides molded articles having excellent impact strength and heat resistance. More particularly, the present invention relates to an impact resistant polyester resin composition which has a high crystallization speed and exhibits excellent mold release properties at a mold temperature of not more than about 120° C. in injection molding, and further which provides a molded article having an excellent impact strength and a high heat distortion temperature.

Polyethylene terephthalate is excellent in properties such as mechanical and electrical properties, heat resistance and chemical resistance, and thus is widely used in production of many industrial products such as fibers and films. When used as fibers and films, it is usually subjected to orientation treatment. In the case, however, wherein it is injection molded and used as a molded product in the application of plastics, it is not subjected to such an orientation treatment. Thus, as is well known, various problems arise in the molding of polyethylene terephthalate and physical properties of the molded product. That is, the crystallization speed of polyethylene terephthalate at low temperatures is small; since the crystallization speed is not sufficiently high at a mold temperature of not more than about 120° C. which is usually employed in injection molding of other plastics, the molded product formed is not uniform in mechanical properties, dimensional stability, and shape stability, because of a difference in the crystallization speed between the surface and the inside portion of the molded product. It is therefore quite difficult to produce a molded product which is suitable for practical use.

In order to solve the above problems, various methods have been proposed, including a method using a high temperature mold, a method of adding a crystal nucleating agent and a crystallization-accelerating agent, and a method of blending polyethylene terephthalate with an ethylene terephthalate-based copolymer exhibiting excellent low temperature crystallinity. It has been confirmed that these methods have succeeded in solving the above problems to a considerable extent. Fully crystallized polyethylene terephthalate or a composition containing such polyethylene terephthalate, particularly compounded with a fibrous reinforcing material such as glass fibers exhibits excellent mechanical properties and has a high heat distortion temperature. Thus it is now widely used as an industrial plastic.

However, a disadvantage of a polyethylene terephthalate composition or a reinforced polyethylene terephthalate composition with glass fibers compounded thereto is that the impact strength is low; that is, the toughness is poor. It has therefore been desired to increase the impact strength.

Several methods have been proposed to solve the above problems, i.e., to increase the impact strength. For example, Japanese Patent Application (OPI) Nos. 144452/76, 32045/77, and 17148/83 (the term "OPI" as used herein means a "published unexamined Japanese patent application"), Japanese Patent Publication No. 17151/83, U.S. Pat. Nos. 4,284,540 and 4,461,871 describe that the impact strength of the polyethylene terephthalate composition is increased if copolymers containing a glycidyl group in polyester, such as an ethylene/vinyl acetate/glycidyl acrylate or methacrylate copolymer is compounded. Olefin-based polymers prepared by copolymerization of glycidyl acrylate or methacrylate, i.e., polyolefins containing an epoxy group, when compounded to polyethylene terephthalate (hereinafer abbreviated to "PET"), increases the impact strength of PET, but seriously deteriorates its mold release properties from a mold during the molding process, thereby producing a problem in that the surface luster of the final molded product is poor when a mold of low temperature is used, i.e., the mold temperature is not more than 120° C. A more significant problem is that when polyolefin containing an epoxy group is compounded to PET, and then kneaded and pelletized by the use of an extruder, for example, gel formation occurs to some extent, and, in some cases, a large amount of gel is formed and the operation cannot be performed.

The present inventors, therefore, have discovered that if specific amounts of modified polyolefin or olefin-based elastomer (corresponding to the component (b) of the present invention) and of glycidyl acrylate or methacrylatecopolymerized polyolefin (corresponding to the component (c) of the present invention) are compounded to thermoplastic polyester, the impact strength is greatly increased by the effect of use of the components in combination. Based on this discovery, Tokuzawa et al have filed a Japanese patent application (Japanese Patent Application (OPI) No. 115352/84).

It has been found, however, that with the above composition no molding problem arises when polybutylene terephthalate is used as the thermoplastic polyester, but when PET is used as the thermoplastic polyester, various molding problems arise. That is, if the above composition is used to mold a slightly complicated article, its mold release properties are adversely affected, although this problem is not severe in molding an article having a simple shape, such as a test piece and, therefore, the composition is not suitable for practical use. Moreover, when the mold temperature is low, various problems arise; for example, when the molding temperature is not more than 120° C., not only is the molded product poor in appearance but also even if it is reinforced with glass fibers, for example, the heat distortion temperature is not increased and the heat resistance is poor because of insufficient crystallization, and although the impact resistance in the vicinity of room temperature is increased, the impact resistance at low temperatures between −10° C. and −30° C. is not increased to an expected extent.

SUMMARY OF THE INVENTION

The present inventors have made extensive investigations on a method of overcoming the above problems. It has been found that in the composition as described in Japanese Patent Application (OPI) No. 115352/84, comprising a polyolefin prepared by copolymerization of glycidyl acrylate or methacrylate (the component (c)) and a specific modified polyolefin or olefin-based elastomer (the component (b)), if part of PET is replaced with a specific polyester and furthermore an ester-based plasticizer is compounded at the component (d), the formation of gel in producing pellets after melt kneading is prevented and the operation procedure can be stabilized, and moreover if the components (a) and (d), i.e., an ester-based plasticizer are compounded, the crystallization speed of PET is increased; and even if molding is carried out at a mold temperature of not more than 120° C., a molded product having excellent surface luster can be obtained and its mold release properties are greatly improved. Furthermore, if part of PET is replaced with a specific polyester, the resulting polyester resin composition is significantly increased in impact strength in a low temperature range, for example, in a range of from −10° C. to −30° C., and the heat distortion temperature is increased. Based on these findings, the present invention has been accomplished.

The present invention relates to a polyester resin composition for forming an impact resistant article comprising from 40 to 97 parts by weight of polyethylene terephthalate and from 3 to 60 parts by weight of at least one polyester selected from (1) an ethylene terephthalate-based polyester comprising from 5 to 25 wt% of at least one dibasic acid represented by formula (I)

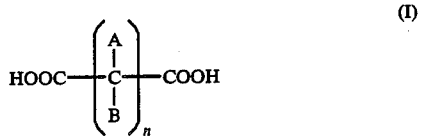

wherein A and B (which may be the same of different) each represents a hydrogen atom, an alkyl group, or a phenyl group, and n is an integer of not less than 10, and ester bond-forming derivative thereof, (2) an ethylene terephthalate-based polyester comprising from 3 to 25 wt% of at least one polyalkylene glycol having a molecular weight of about from 500 to 20,000, and (3) polyarylate, which composition further contains, per 100 parts by weight of the polyester, (a) from 0.05 to 10 parts by weight of at least one of an inorganic crystal nucleating agent having an average particle diameter of not more than 50 μm, an organic compound containing the metal salt of a carboxyl group, and a polymer compound containing the metal salt of a carboxyl group, (b) from 3 to 30 parts by weight of modified polyolefin or modified olefin-based elastomer prepared by adding from 0.001 to 10 mol% of an alicyclic carboxylic acid containing a cis-double bond in the ring or its functional derivative to polyolefin or olefin-based elastomer, (c) from 1 to 30 parts by weight of a copolymer comprising from 80 to 99 wt% of α-olefin, from 1 to 20 wt% of glycidyl methacrylate or glycidyl acrylate, and up to 19 wt% of vinyl acetate, (d) from 0.3 to 10 parts by weight of an ester-based plasticizer, and (e) up to 150 parts by weight of a fibrous reinforcing material.

DETAILED DESCRIPTION OF THE INVENTION

In accordance with the present invention, which comprises compounding the components (a) to (d), and, if desired, the component (e) to a mixture of PET and a specific polyester, operation stability in heat melting the components and producing pellets is improved, a composition exhibiting excellent crystallization characteristics and mold releasing properties at a mold temperature of not more than 120° C. is provided, and a molded product prepared from the composition has an excellent appearance and exhibits excellent impact resistance, particularly high impact strength in a low temperature range, and excellent heat resistance. Thus, a composition useful as a molding material is provided.

PET which is used in the present invention is prepared by melt polymerization of terephthalic acid or a derivative thereof and ethylene glycol, or solid phase polymerization thereof. The molecular weight of the PET is not critical.

As the ethylene terephthalate-based copolymer polyester which is used in combination with PET in the present invention, a copolymer of a dibasic acid represented by formula (I) or its ester bond-forming derivative is effective. If n is not more than about 9, the impact strength in a low temperature range of 0° C. to 60° C. is improved only insufficiently. In connection with the copolymerization ratio of the compound represented by formula (I), if it is less than 5 wt%, the effects of increasing the impact strength in a low temperature range and of accelerating crystallization are undesirably poor. On the other hand, if the copolymerization ratio is in excess of 25 wt%, the heat resistance as a resin composition is undesirably decreased. Accordingly the copolymerization ratio of the compound having formula (I) is generally from 5 to 25 wt%, and preferably from 10 to 20 wt%. Representative examples of the dibasic acid represented by formula (I) include decane-1,10-dicarboxylic acid, undecane-1,11-dicarboxylic acid, dodecane-1,12-dicarboxylic acid, tetradecane-1,14-dicarboxylic acid, hexadecane-1,16-dicarboxylic acid, octadecane-1,18-dicarboxylic acid, 6-ethyl-hexadecane-1,16-dicarboxylic acid, 7,8-diphenyl-tetradecane-1,14-dicarboxylic acid, and the like. Of these compounds, octadecane-1,18-dicarboxylic acid, 6-ethyl-hexadecane-1,16-dicarboxylic acid, and tetradecane-1,14-dicarboxylic acid are useful.

As the ethylene terephthalate-based copolymer polyester, polyalkylene glycol and its derivatives are useful. If the molecular weight of polyalkylene glycol is less than about 500, the effect of increasing the impact strength in a low temperature range is small. On the contrary, if the molecular weight is more than about 20,000, the copolymer polyester undesirably becomes difficult to prepare. In connection with its copolymerization ratio, if it less than 3 wt%, the effects of increasing the impact strength in a low temperature range and of accelerating the crystallization are undesirably small. On the other hand, if it is in excess of 25 wt%, the heat resistance as a resin composition is undesirably decreased. Accordingly the copolymerization ratio of polyalkylene glycol or derivative thereof is from 3 to 25 wt% and preferably from 10 to 20 wt%. Representative examples of the polyalkylene glycol are polyethylene glycol, polypropylene glycol, and polytetramethylene glycol. Examples of the polyalkylene glycol derivative are polyether compounds prepared by ring opening adduction of ethylene oxide, propylene oxide, or butylene oxide, for example, to a phenolic hydroxyl group of a bisphenol compound such as bisphenol A.

The polyarylate that is used in the present invention is a polyester prepared from an aromatic dicarboxylic acid component and a bisphenol component. Representative examples of the aromatic dicarboxylic acid component are phthalic acid, isophthalic acid, terephthalic acid, naphthalenedicarboxylic acid, diphenyl ether dicarboxylic acid, diphenylmethanedicarboxylic acid, and diphenylsulfonedicarboxylic acid. Representative examples of the bisphenol are catechol, resorcinol, hydroquinone, dihydroxynaphthalene, 4,4'-dihydroxybiphenyl, 4,4'-dihydroxydiphenyl ether, 4,4'-dihydroxy-2,2'-dimethyldiphenyl ether, 4,4'-dihydroxy-3,3'-dichlorodiphenyl ether, 4,4'-dihydroxydiphenyl sulfide, 4,4'-dihydroxydiphenylsulfone, 4,4'-dihydroxydiphenyl ketone, 4,4'-dihydroxydiphenyl methane, and their dihydroxy isomers other than the 4,4'-derivatives, 1,1-bis(4-hydroxyphenyl)ethane, 2,2-bis(4-hydroxyphenyl)propane, 1,1-bis(4-hydroxyphenyl)-n-butane, bis(4-hydroxyphenyl)cyclohexylmethane, 1,1-bis(4-hydroxyphenyl)-2,2,2-trichloroethane, 2,2-bis(4-hydroxy-3,5-dimethylphenyl)propane, 2,2-bis(4-hydroxy-3,5-dibromophenyl)propane, and their isomers. In the present invention, polyarylate comprising a terephthalic acid component, an isophthalic acid component, and a 2,2-bis(4-hydroxyphenyl)propane component is particularly useful.

The effect as a crystal nucleating agent of the inorganic compound used as the component (a) varies with its particle diameter. If the average particle diameter is in excess of about 50 μm, the effect is decreased. Accordingly, usually, those inorganic compounds having an average particle diameter of not more than 50 μm are most useful.

Representative examples of the inorganic compound having an average particle diameter of not more than 50 μm are carbon black, silica, calcium carbonate, synthetic silicic acid or a silicate, zinc white, hallosite clay, kaolin, basic magnesium carbonate, mica, talc, silica powder, diatomaceous earth, dolomite power, titanium oxide, zine oxide, antimony oxide, barium sulfate, calcium sulfate, alumina, and calcium silicate. These compounds can be used alone or in combination with each other. Of these compounds, mica, kaolin, talc, and silica are particularly useful in the present invention.

As the organic compound containing the metal salt of a carboxyl group that is used in the present invention, any compounds containing the metal salt of a carboxylic acid can be used. Usually the metal salts of higher fatty acids having about from 7 to 30 carbon atoms and aromatic acids are used. Representative examples are the metal salts of higher fatty acids such as heptanoic acid, pelargonic acid, lauric acid, myristric acid, palmitic acid, stearic acid, behenic acid, cerotinic acid, montanic acid and melissic acid, and of aromatic acids such as benzoic acid, terephthalic acid, monomethyl terephthalate, isophthalic acid, monoethyl isophthalate, and the like.

As the polymer compound containing the metal salt of a carboxyl group, any polymers having the metal salt of a carboxyl group at a terminal or side chain thereof can be used. Representative examples are the metal salts of carboxyl group-containing polyethylene obtained by oxidation of polyethylene, carboxyl group-containing polypropylene obtained by oxidation of polypropylene, copolymers of olefins such as ethylene, propylene, and butene-1, and acrylic acid or methacrylic acid, copolymers of olefins and maleic anhydride, copolymers of styrene and acrylic acid or methacrylic acid, and copolymers of styrene and maleic anhydride. Usually the metal salts of copolymers of olefins and acrylic acid or methacrylic acid, and of copolymers of styrene and acrylic acid or methacrylic acid are used. As the metal to form the above salts, alkaline earth metals and alkali metals, for example, are usually used. With respect to the effect as the crystal nucleating agent, alkali metals are superior. In particular, sodium and potassium are useful.

As the polyolefin or olefin-based elastomer to be used as a starting material for preparation of the component (b) of the present invention, modified polyolefin or modified olefin-based elastomer, homo- and copolymers of olefins, such as polyethylene, polypropylene, polybutene-1 and polypentene-1, and copolymers of different olefins or olefins and dienes, such as an ethylene-propylene copolymer, an ethylene-butene-1 copolymer, a propylene-butene-1 copolymer, an ethylene-vinyl acetate copolymer, a propylene-vinyl acetate copolymer, an ethylene-butadiene copolymer, an ethylene-isoprene copolymer, an ethylene-chloroprene copolymer, a propylene-butadiene copolymer, an ethylene-propylenebutadiene copolymer, and the like can be used. The type of copolymerization may be any of random copolymerization, block copolymerization, graft copolymerization, and alternative copolymerization.

Particularly preferred are an ethylene-propylene copolymer, an ethylene-butene-1 copolymer, an ethylene-vinyl acetate copolymer, an ethylene-propylene-butadiene copolymer, an ethylene-propylene-isoprene copolymer, an ethylene-propylene-chloroprene copolymer, and the like. These polyolefins and olefin-based elastomers can, of course, be used as mixtures comprising two or more thereof.

The alicyclic carboxylic acid containing a cis-double bond in the ring thereof which is used in the present invention includes cis-4-cyclohexene-1,2-dicarboxylic acid, endo-bicyclo-[2,2,1]-5-heptene-2,3-dicarboxylic acid, methyl-endo-cis-bicyclo-[2,2,1]-5-heptene-2,3-dicarboxylic acid, endo-bicyclo-[2,2,1]-1,2,3,4,7,7-hexachloro-2-heptene-5,6-dicarboxylic acid, and the like. The functional derivative includes the acid anhydrides, esters, acid amides, acid halides, metal salts, and the like of the above compounds.

Particularly preferred are endo-bicyclo-[2,2,1]-5-heptene-2,3-dicarboxylic acid and its acid anhydride. The functional derivative is not always required to be made a functional derivative prior to addition of the polyolefin or olefin-based elastomer. For example, during the modification of the polyolefin or olefin-based elastomer, or after the preparation of the polyester resin composition, it may be converted into the functional derivative.

The modified polyolefin or modified olefin-based elastomer of the present invention includes a modified polyolefin or modified olefin-based elastomer obtained by adding at least one compound selected from the alicyclic carboxylic acid containing a cis-double bond in the ring thereof or its functional derivative to the above polyolefin or olefin-based elastomer, and mixtures of the modified polyolefin or modified olefin-based elastomer and an unmodified polyolefin or unmodified olefin-based elastomer. The modified polyolefin or modified olefin-based elastomer can be prepared by various methods. Preferably a radical generator such as an organic peroxide, e.g., di-tert-butyl peroxide, dicumyl peroxide and benzoyl peroxide is added to the above polyolefin or olefin-based elastomer and the above alicyclic carboxylic acid containing a cis-double bond or its functional derivative, and the resulting mixture is heated, or the polyolefin or olefin-based elastomer and its carboxylic acid or functional derivative are dispersed in water and then heated in the presence of the above radical generator or a water-soluble peroxide.

The proportion of the above carboxylic acid or its functional derivative being added to the polyolefin or olefin-based elastomer varies with the purpose of use of the resulting resin composition, the type and mixing ratio of the polyolefin or olefin-based elastomer, and the type of the carboxylic acid or its functional derivative. Usually the above carboxylic acid or its functional derivative is added in a proportion of from 0.001 to 10 mol% based on the polyolefin or olefin-based elastomer. Preferably the proportion is from 0.01 to 5.0 mol%, and more preferably it is from 0.05 to 2.0 mol%.

If the amount of the above carboxylic acid or its functional derivative added is less than 0.001 mol%, compatibility and interfacial adhesion properties of the polyester including PET are poor. For this reason, the effect as an impact strength-increasing agent is exhibited only insufficiently. On the other hand, if the above carboxylic acid or its functional derivative is added in a proportion of more than 10 mol%, side reactions such as degradation of the polyolefin or olefin-based elastomer into low molecular weight compounds and gelation undesirably occur during the step of adding to or compounding with PET, for example.

The glycidyl acrylate or methacrylate content of the α-olefin-glycidyl acrylate or methacrylate copolymer or α-olefin-glycidyl acrylate or methacrylate-vinyl acetate copolymer which is used as the component (c) of the present invention is from 1 to 20 wt% and preferably from 1 to 10wt%. If the glycidyl acrylate or methacrylate content is less than 1 wt%, the impact strength is improved only insufficiently when it is used in combination with the abovemodified polyolefin or modified olefin-based elastomer. On the other hand, if the glycidyl acrylate or methacrylate content is more than 20 wt%, side reactions such as gelation may undesirably occur during the preparation of the resin composition of the present invention.

The α-olefin component of these copolymers includes ethylene, propylene, and butene-1.

The copolymer can contain up to 19 wt% of a vinyl acetate component. If the vinyl acetate content is in excess of 19 wt%, the resulting resin composition is undesirably decreased in heat stability.

As the ester-based plasticizer to be used as the component (d) of the present invention, various compounds can be used. In particular, the ester compounds represented by formulae (I), (II), and (III) are preferred.

Formula (I) is represented by

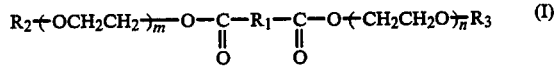  (I)

wherein
$R_1$ represents an alkylene group,
$R_2$ and $R_3$ (which are the same or different) each represents a group selected from an alkyl group, a benzyl group, and an aromatic substituted benzyl group, and
m and n each is an integer of 1 or more.

Formula (II) is represented by

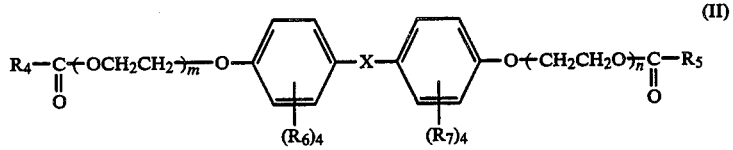 (II)

wherein
X represents a chemical bond, an alkylene group, $-SO_2-$, $-S-$,

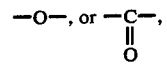

$R_4$ and $R_5$ (which are the same or different) each represents a group selected from an alkyl group, a benzyl group, a phenyl group and derivatives thereof,
$R_6$ and $R_7$ (which are the same or different) each represents a hydrogen atom, an alkyl group, or a halogen atom, and
m and n each is an integer of 1 or more.

Formula (III) is represented by

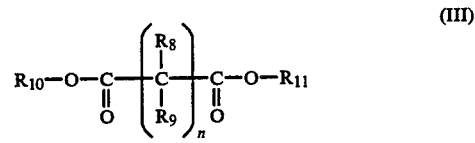 (III)

wherein
$R_8$ and $R_9$ (which are the same or different) each represents group selected from a hydrogen atom, an alkyl group, a phenyl group, a benzyl group, and derivatives thereof;
$R_{10}$ represents a group selected from a phenyl group, a benzyl group, and derivatives thereof;
$R_{11}$ represents a group selected from a hydrogen atom, an alkyl group, and the groups defined for $R_{10}$; and
n is an integer of 4 or more.

Representative examples of the fibrous reinforcing material that is used in the present invention include glass, carbon, aromatic polyamide, silicon carbide, and titanic acid fibers. Usually glass fibers are used. These fibers are not critical in diameter and length. However if the length is too large, the fibers are difficult to uniformly mix with the polyester and other components. On the contrary, if the fibers are too short, their effect as the reinforcing material is exhibited only insufficiently. Usually those fibers having a length of from 0.1 to 10 mm are used. In the case of glass fibers, the length is preferably from 0.1 to 7 mm and more preferably from 0.3 to 4 mm. The fibrous reinforcing material can be treated with various compounds for the purpose of increasing the reinforcing effect by increasing the interfacial adhesion force to the polyester. In the case of glass fibers, various surface-treating agents can be used. That is, glass fibers treated, for example, with a silane-based treating agent (e.g., vinyltriethoxysilane, γ-methacryloxypropylmethoxysilane, β-(3,4-epoxycyclohexyl)ethyltrimethoxysilane, γ-glycidoxypropyltrimethoxysilane, γ-aminopropyltriethoxysilane, γ-chloropropylmethoxysilane, and γ-mercaptopropyltrimethoxysilane) and a chromium-based treating agent (e.g., methacrylate chromic chloride) can be used.

The proportion of each component in the polyester resin composition of the present invention will hereinafter be described.

If the amount of the component (a), i.e., at least one member of the inorganic compound having an average particle diameter of not more than 50 μm, the organic compound containing a carboxyl group metal salt, and the polymer compound containing a carboxyl group metal salt, being compounded is less than 0.05 part by weight per 100 parts by weight of the polyester component, the effect of the component (a) as a crystal nucleating agent is exhibited only insufficiently. On the other hand, even if the component (a) is compounded in an amount of more than 10 parts by weight, the effect as a crystal nucleating agent is not increased in proportion to the amount; an excess of the component (a) merely acts as a filler.

Thus the amount of the component (a) compounded is generally from 0.05 to 10 parts by weight, preferably from 0.1 to 5 parts by weight, and more preferably from 0.1 to 3 parts by weight, per 100 parts by weight of the polyester component.

If the amount of the component (b), i.e., modified polyolefin or modified olefin-based elastomer, being compounded is less than 3 parts by weight per 100 parts by weight of the polyester, an increase in impact strength due to the use of the component (b) in combination with the component (c) is small. On the other hand, if the amount of the component (b) compounded is in excess of 30 parts by weight, the resulting composition is undesirably decreased in heat stability.

Thus the amount of the component (b) compounded is generally from 3 to 30 parts by weight, preferably from 5 to 25 parts by weight, and more preferably from 5 to 20 parts by weight.

In connection with the amount of the component (c), i.e., polyolefin prepared by copolymerization of glycidyl acrylate or methacrylate, if the amount of the component (c) compounded is less than 1 part by weight, the impact strength is increased only to a limited extent. On the other hand, even if the component (c) is added in an amount of more than 30 parts by weight, the impact strength is not further increased beyond a certain level; rather, gelation is undesirably accelerated during heat kneading.

Thus the amount of the component (c) compounded is generally from 1 to 30 parts by weight, preferably from 3 to 20 parts by weight, and more preferably from 3 to 15 parts by weight. The ratio of the component (b) to the component (c) is generally from 10/1 to 1/10, preferably from 10/1 to 1/2, and more preferably from 5/1 to 1/1 in that the impact strength can be effectively increased.

If the amount of the component (d), i.e., ester-based plasticizer, being compounded is less than 0.3 part by weight, the crystallization-accelerating effect and the mold release-improving effect are poor. On the other hand, if the component (d) is added in an amount of more than 10 parts by weight, the heat resistance is undesirably decreased.

Thus the amount of the component (d) compounded is generally from 0.3 to 10 parts by weight, and preferably from 1 to 7 parts by weight.

In the present invention, a fibrous reinforcing material is added if desired. If the amount of the fibrous reinforcing material compounded is in excess of 150 parts by weight, the material becomes difficult to uniformly disperse in or mix with the resin. Thus the amount of the fibrous reinforcing material compounded is generally not more than 150 parts by weight, and more usually not more than 100 parts by weight.

To the composition of the present invention, if desired, various organic or inorganic compounds such as an antioxidant, an ultraviolet absorber, a coloring agent, and a filler can be compounded within a range so as not to seriously decrease the impact strength. The composition of the present invention is not critical in the preparation thereof, and can be molded into various shapes such as a molding, a sheet, a fibrous material, and a tube.

The present invention is described in greater detail with reference to the following examples. In the examples and comparative examples, all parts are by weight.

REFERENCE EXAMPLE 1

1,000 parts by weight of an ethylene-propylene copolymer (hereinafter abbreviated to "EPR"; melt index: 2.0 g/10 min/190° C.; ethylene content: 72.0 wt%), 3 parts by weight of endo-bicyclo-[2,1,1]-5-heptene-2,3-dicarboxylic acid anhydride, and 1 part by weight of di-tert-butyl peroxide were mixed at ordinary temperature in a Henschel mixer. The resulting mixture was fed to a single-screw extruder and extruded at 200° C. to produce cylindrical pellets (diameter: 2 mm; length: 3 mm) of the modified polyolefin.

REFERENCE EXAMPLES 2 TO 5

Pellets of polyolefin modified with an alicyclic dicarboxylic acid anhydride were prepared in the same manner as in Example 1 except that as the polyolefin an ethylenebutene-1 copolymer (hereinafter abbreviated at "E/B copolymer"), polypropylene (hereinafter abbreviated to "PP"), polyethylene (hereinafter abbreviated to "PE"), or an ethylene-vinyl acetate copolymer (hereinafter abbreviated to "EVA") as shown in Table 1 was used and the endo-bicyclo-[2,2,1]-5-heptene-2,3-dicarboxylic acid anhydride as the alicyclic dicarboxylic acid containing a cis-double bond in the ring was used in the proportion shown in Table 1.

TABLE 1

| Reference Example | Polyolefin type | Melt Index (g/10 min/190° C.) | Amount of Modifier (wt %) |
| --- | --- | --- | --- |
| 2 | E/B copolymer | 3.0 | 0.2 |
| 3 | PP | 2.0 | 0.2 |
| 4 | PE | 1.0 | 0.2 |
| 5 | EVA | 4.0 | 0.1 |

EXAMPLES 1 TO 5 AND COMPARATIVE EXAMPLES 1 TO 3

Polyethylene terephthalate (PET) having an inherent viscosity (as determined at a temperature of 20° C. in a phenol/tetrachloroethane (6/4) mixture in a concentration of 0.5%) of 0.68, an ethylene terephthalate-based copolymer (copolymerization PET) derived by copolymerization of dibasic acids, a crystal nucleating agent, a plasticizer, modified polyolefin, and glycidyl methacrylate-copolymerized polyolefin (GM copolymer) were mixed in the proportions shown in Table 2. The resulting mixture was kneaded and extruded by the use of a co-rotating twin-screw extruder under the conditions of a cylinder temperature 260° C. and a screw rotation 200 rpm to produce pellets. These pellets were dried under reduced pressure and then molded under conditions of cylinder temperature 260° C., mold temperature 105° C., and cooling time 20 seconds to produce a test piece (⅛ inch×½ inch×2.5 inch). Using this test piece, the notched Izod impact strength was measured according to ASTM D-638 at room temperature and −20° C., and its surface luster was evaluated. The mold release properties were evaluated in terms of the minimum cooling time when a box-like molding (length: 10 cm; width: 7 cm; depth: 4 cm; wall thickness: 1.5 mm) was molded at a mold temperature of 105° C., after which the molding could be removed. As the minimum cooling time is shorter, the release properties are better.

The results are shown in Table 2.

C: Octadecane-1,18-dicarboxylic acid (7 wt%) and 6-ethylhexadecane-1,16-dicarboxylic acid (3 wt%)-copolymerized PET (inherent viscosity: 0.73)

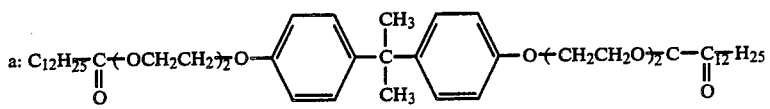

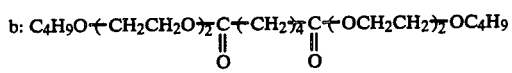

c: Azelaic acid dibenzyl ester
d: Adipic acid dibenzyl ester
X: Ethylene (92 wt%)-glycidyl methacrylate (8 wt%) copolymer
Y: Ethylene (91 wt%)-glycidyl methacrylate (7 wt%)-vinyl acetate (2 wt%) copolymer.
Surlyn 1555: Ethylene-acrylic acid copolymer sodium salt (produced by Dupont Co.)

EXAMPLE 6 AND COMPARATIVE EXAMPLE 4

TABLE 2

| Example No. | Amount of PET (part) | Copolymer PET Type | Copolymer PET Amount (part) | Nucleating Agent Type | Nucleating Agent Amount (part) | Plasticizer Type | Plasticizer Amount (part) | Modified Polyolefin Type | Modified Polyolefin Amount (part) | GM Copolymer Type | GM Copolymer Amount (part) | Izod Strength (kg-cm/cm) Room Temp. | Izod Strength (kg-cm/cm) −20° C. | Cooling Time for Molding of Box (sec.) | Appearance |
|---|---|---|---|---|---|---|---|---|---|---|---|---|---|---|---|
| Example 1 | 70 | A | 30 | talc | 2 | a | 3 | Reference Example 1 | 20 | X | 10 | 73 | 44 | 10 | Good |
| Example 2 | 80 | B | 20 | Surlyn 1555 | 3 | b | 5 | Reference Example 2 | 15 | X | 15 | 65 | 37 | 10 | " |
| Example 3 | 60 | C | 40 | talc | 2 | c | 3 | Reference Example 3 | 10 | Y | 7 | 67 | 42 | 10 | " |
| Example 4 | 90 | A | 10 | talc | 1 | d | 7 | Reference Example 4 | 15 | Y | 7 | 61 | 38 | 10 | " |
| Example 5 | 40 | A | 60 | Surlyn 1555 | 2 | a | 3 | Reference Example 5 | 10 | X | 15 | 70 | 47 | 10 | " |
| Comparative Example 1 | 100 | — | — | — | — | — | — | Reference Example 1 | 20 | X | 10 | 49 | 8 | >60 | Bad |
| Comparative Example 2 | 70 | A | 30 | talc | 2 | — | — | Reference Example 1 | 20 | X | 10 | 56 | 25 | 45 | Slightly bad |
| Comparative Example 3 | 70 | A | 30 | talc | 2 | a | 3 | — | — | X | 30 | 32 | 19 | 20 | Slightly bad |

A: Octadecane-1,18-dicarboxylic acid (20 wt%)-copolymerized PET (inherent viscosity: 0.71)
B: Tetradecane-1,14-dicarboxylic acid (15 wt%)-copolymerized PET (inherent viscosity: 0.66)

To the composition shown in Example 1 were further compounded glass fibers (3 mm long chopped strand No. 429, produced by Asahi Fiber Glass Co., Ltd.) in such an amount that the glass fiber content was 30 wt% based on the total weight of the resulting composition. The resulting composition was kneaded and pelletized by the use of a twin-screw extruder (Example 6). For comparison, glass fiber-containing (30 wt%) pellets were prepared using the composition shown in Comparative Example 1 (Comparative Example 4). These pellets were molded under conditions of a cylinder temperature, 240°-260°-260° C., mold temperature 105° C., and cooling time 10 seconds, to prepare test specimens. Each test specimen was measured for the notched Izod strength (test specimen thickness: ½ inch) according to ASTM D-638 and the heat distortion temperature (test specimen thickness: ⅛ inch) under a load of 18.56 kg/cm².

Additionally, the mold release properties were evaluated in terms of the minimum cooling time in the molding of a box as determined at a mold temperature of 90° C. by the same method as described above.

the type of polyalkylene glycol used was changed), a crystal nucleating agent, an ester-based plasticizer, a modified polyolefin, and a GM copolymer in the amounts shown in Table 4, and the resulting composition was pelletized in the same manner as in Examples 1 to 5. These pellets were dried and then molded at a cylinder temperature of 260° C. and a mold temperature of 105° C. to produce a test piece. This test piece was measured for the notched Izod impact strength, surface luster, and mold release properties as described above. The results are shown in Table 4. It can be seen that the present invention has a high impact strength in a low temperature range, and excellent surface luster and mold releasing properties.

TABLE 4

| Example No. | Amount of PET (part) | Copolymer PET Type | Copolymer PET Amount (part) | Nucleating Agent Type | Nucleating Agent Amount (part) | Plasticizer Type | Plasticizer Amount (part) | Modified Polyolefin Type | Modified Polyolefin Amount (part) | GM Copolymer Type | GM Copolymer Amount (part) | Izod Strength (kg-cm/cm) Room Temp. | Izod Strength (kg-cm/cm) −20° C. | Cooling Time for Molding of Box (sec.) | Appearance |
|---|---|---|---|---|---|---|---|---|---|---|---|---|---|---|---|
| Example 7 | 70 | D | 30 | talc | 2 | a | 5 | Reference Example 1 | 15 | X | 10 | 64 | 43 | 10 | Good |
| Example 8 | 60 | E | 40 | talc | 2 | b | 3 | Reference Example 2 | 10 | X | 10 | 62 | 40 | 10 | " |
| Example 9 | 80 | D | 20 | Surlyn 1555 | 3 | c | 5 | Reference Example 3 | 20 | Y | 10 | 60 | 37 | 10 | " |
| Example 10 | 90 | F | 10 | Surlyn 1555 | 2 | d | 7 | Reference Example 4 | 15 | Y | 7 | 58 | 34 | 10 | " |
| Example 11 | 40 | E | 60 | talc | 1 | a | 3 | Reference Example 5 | 10 | Y | 6 | 67 | 41 | 10 | " |
| Comparative Example 4 | 100 | — | — | — | — | — | — | Reference Example 1 | 20 | Y | 10 | 47 | 9 | >60 | Bad |
| Comparative Example 5 | 70 | D | 30 | talc | 2 | — | — | Reference Example 1 | 15 | Y | 10 | 49 | 19 | 50 | " |
| Comparative Example 6 | 70 | D | 30 | " | 2 | a | 3 | — | — | Y | 25 | 30 | 14 | 25 | " |

TABLE 3

| Run No. | Izod Strength (kg-cm/cm) Room Temp. | Izod Strength (kg-cm/cm) −20° C. | Heat Distortion Temperature (°C.) | Cooling Time in Molding of Box (sec) |
|---|---|---|---|---|
| Example 6 | 24 | 21 | 212 | 5 |
| Comparative Example 4 | 17 | 12 | 145 | >60 |

EXAMPLES 7 TO 11 AND COMPARATIVE EXAMPLES 4 TO 6

To PET (inherent viscosity: 0.68) were compounded an ethylene terephthalate-based copolymer (in which D: Polytetramethylene glycol (molecular weight: about 2,000) (20 wt%)-copolymerized PET (inherent viscosity: 0.74)

E: Polyethylene glycol (molecular weight: about 1,000) (10 wt%)-copolymerized PET (inherent viscosity: 0.67)

F: Polytetramethylene glycol (molecular weight: about 4,000) (15 wt%)-copolymerized PET (inherent viscosity: 0.70)

EXAMPLE 12 AND COMPARATIVE EXAMPLE 7

To the composition shown in Example 7 was further compounded glass fibers (No. 429) in such an amount that the glass fiber content was 30 wt% based on the total weight of the resulting composition, and the resulting composition was kneaded in a twin-screw extruder and pelletized (Example 12). For comparison, glass fiber-containing pellets (glass fiber content: 30 wt%) were produced using the composition shown in Comparative Example 4 (Comparative Example 7). These pellets were molded at a cylinder temperature, 240°-260°-260° C., a mold temperature of 105° C. and a cooling time of 10 seconds to produce test pieces. Each test piece was measured for the notched Izod impact strength (test piece thickness: ½ inch) according to ASTM D-638 and the heat distortion temperature under a load of 18.56 kg/cm² (test piece thickness: ¼ inch).

Additionally, the mold release properties were evaluated in terms of the minimum cooling time in the molding of a box at a mold temperature of 90° C. according to the method as described above.

merization PET, crystallization is achieved insufficiently because the crystallization speed at a low mold temperature (90° C.) is small, and therefore the heat distortion temperature is not increased and the mold release properties are bad, while on the other hand the composition of the present invention is excellent in impact strength, heat distortion temperature, and mold release properties.

EXAMPLES 13 TO 17 AND COMPARATIVE EXAMPLES 8 TO 10

To PET having an inherent viscosity of 0.78 were compounded predetermined amounts of polyarylate, crystal nucleating agent, ester-based plasticizer, modified polyolefin, and GM copolymer as shown in Table 6, and the resulting mixture was pelletized by the same method as described above a cylinder temperature of 280° C. and a number of screw rotation of 200 rpm. These pellets were dried and then molded into a test piece under the conditions of a cylinder temperature, 250°-270°-275° C., and a mold temperature of 105° C. This test piece was measured for notched Izod impact strength, surface luster, and mold release properties. The results are shown in Table 6.

TABLE 5

| Run No. | Izod Strength (kg-cm/cm) Room Temp. | −20° C. | Heat Distortion Temperature (°C.) | Cooling Time in Molding of Box (sec) |
| --- | --- | --- | --- | --- |
| Example 12 | 22 | 19 | 217 | 5 |
| Comparative Example 7 | 16 | 10 | 143 | >60 |

TABLE 6

| Example No. | A-mount of PET (part) | Copolymer PET Type | Copolymer PET A-mount (part) | Nucleating Agent Type | Nucleating Agent A-mount (part) | Plasticizer Type | Plasticizer A-mount (part) | Modified Polyolefin Type | Modified Polyolefin A-mount (part) | GM Copolymer Type | GM Copolymer A-mount (part) | Izod Strength (kg-cm/cm) Room Temp. | −20° C. | Cooling Time for Molding of Box (sec.) | Appearance |
| --- | --- | --- | --- | --- | --- | --- | --- | --- | --- | --- | --- | --- | --- | --- | --- |
| Example 13 | 70 | G | 30 | talc | 1 | a | 5 | Reference Example 1 | 10 | X | 10 | 63 | 38 | 10 | Good |
| Example 14 | 70 | H | 30 | " | 1 | b | 3 | Reference Example 2 | 15 | X | 10 | 67 | 41 | 10 | " |
| Example 15 | 80 | G | 20 | Surlyn 1555 | 2 | c | 5 | Reference Example 3 | 20 | Y | 7 | 61 | 39 | 10 | " |
| Example 16 | 90 | H | 10 | Surlyn 1555 | 3 | d | 6 | Reference Example 4 | 7 | Y | 13 | 58 | 35 | 10 | " |
| Example 17 | 60 | G | 40 | talc | 1 | a | 4 | Reference Example 5 | 10 | Y | 10 | 65 | 43 | 10 | " |
| Comparative Example 8 | 100 | — | — | — | — | — | — | Reference Example 1 | 10 | X | 10 | 45 | 8 | >60 | Bad |
| Comparative Example 9 | 70 | G | 30 | talc | 1 | — | — | Reference Example 1 | 10 | X | 10 | 48 | 16 | 50 | " |
| Comparative Example 10 | 70 | G | 30 | " | 1 | a | 5 | — | — | X | 20 | 42 | 12 | 20 | " |

It can be seen that in the composition not containing the nucleating agent, ester-based plasticizer and copoly- G: Polyarylate comprising a terephthalic acid component/an isophthalic acid component (=5/5) and a bisphenol A component H: Polyarylate comprising a terephthalic acid component/an isophthalic acid component (=3/7) and a bisphenol A component

EXAMPLE 18 AND COMPARATIVE EXAMPLE 11

To the composition shown in Example 13 was further compounded glass fibers (No. 429) in such an amount that the glass fiber content was 30 wt% based on the total weight of the resulting composition, and the resulting composition was kneaded in a twin-screw extruder and pelletized (Example 18). For comparison, pellets containing 30 wt% of glass fibers were prepared using the composition shown in Comparative Example 8 in the same manner as above (Comparative Example 11). These pellets were molded under conditions of cylinder temperature, 250°-270°-275° C., mold temperature of 90° C. and cooling time of 10 seconds to prepare the respective test pieces. These test pieces were measured for notched Izod impact strength according to ASTM D-638 and heat distortion temperature under a load of 18.56 kg/cm² (test piece thickness: ⅛ inch). Moreover, the mold release properties were evaluated in terms of the minimum cooling time in the molding of a box at a mold temperature of 90° C. according to the above-described method.

TABLE 7

| Run No. | Izod Strength (kg-cm/cm) Room Temp. | Izod Strength (kg-cm/cm) −20° C. | Heat Distortion Temperature (°C.) | Cooling Time in Molding of Box (sec) |
|---|---|---|---|---|
| Example 18 | 23 | 19 | 221 | 5 |
| Comparative Example 11 | 15 | 11 | 152 | >60 |

It can be seen that in the composition not containing the nucleating agent, ester-based plasticizer, and polyarylate, crystallization is achieved insufficiently, because the crystallization speed at a low mold temperature of 90° C. is small, and therefore the heat distortion temperature is not increased and the mold release properties are poor. On the other hand, the composition of the present invention is excellent in impact strength, heat distortion temperature, and mold release properties.

While the invention has been described in detail and with reference to specific embodiments thereof, it will be apparent to one skilled in the art that various changes and modifications can be made therein without departing from the spirit and scope thereof.

What is claimed is:

1. A polyester resin composition for forming an impact resistant article comprising from 40 to 97 parts by weight of polyethylene terephthalate and from 3 to 60 parts by weight of at least one polyester selected from
   (1) an ethylene terephthalate-based polyester comprising from 5 to 25 wt% of at least one dibasic acid represented by formula (I)

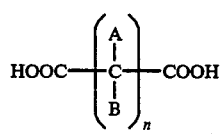

(I)

wherein A and B each represents a hydrogen atom, an alkyl group, or a phenyl group, and n is an integer of not less than 10, and an ester bond-forming derivative thereof,
   (2) an ethylene terephthalate-based polyester comprising 3 to 25 wt% of at least one polyalkylene glycol having a molecular weight of from about 500 to 20,000, and
   (3) a polyarylate, which composition further contains, per 100 parts by weight of the polyester, (a) from 0.05 to 10 parts by weight of at least one of an inorganic crystal nucleating agent having an average particle diameter of not more than 50 μm, an organic compound containing a metal salt of a carboxyl group, and a polymer compound containing a metal salt of a carboxyl group, (b) from 3 to 30 parts by weight of a modified polyolefin or modified olefin elastomer prepared by adding from 0.001 to 10 mol% of an alicyclic carboxylic acid containing a cis-double bond in the ring or its functional derivative to a polyolefin or olefin elastomer, (c) from 1 to 30 parts by weight of a copolymer comprising from 80 to 99 wt% of an α-olefin, from 1 to 20 wt% of glycidyl methacrylate or glycidyl acrylate, and up to 19 wt% of vinyl acetate, (d) from 0.3 to 10 parts by weight of an ester-based plasticizer, and (e) up to 150 parts by weight of a fibrous reinforcing material.

2. A polyester resin composition as in claim 1, wherein the dibasic acid represented by formula (I) is octadecane-1,18-dicarboxylic acid, 6-ethyl-hexadecane-1,16-dicarboxylic acid or tetradecane-1,14-dicarboxylic acid.

3. A polyester resin composition as in claim 1, wherein the polyalkylene glycol is selected from polyethylene glycol, polypropylene glycol, and polytetramethylene glycol, and the polyalkylene glycol derivative is a glycol selected from polyether compounds prepared by adding at least one of ethylene oxide, propylene oxide and butylene oxide to a phenolic hydroxyl group of a bisphenol compound.

4. A polyester resin composition as in claim 1, wherein the polyarylate is a polyester comprising a terephthalic acid component, an isophthalic acid component, and a 2,2-bis(4-hydroxyphenyl)propane component.

5. A polyester resin composition as in claim 1, wherein the ester-based plasticizer is at least one ester compound of the compounds represented by formulae (I), (II), and (III)

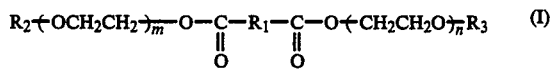

wherein
   $R_1$ represents an alkylene group,
   $R_2$ and $R_3$ each represents a group selected from an alkyl group, a benzyl group, and an aromatic substituted benzyl group, and
   m and n each is an integer of 1 or more;

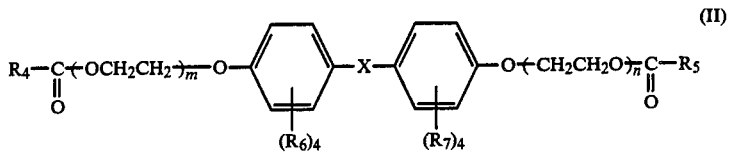

wherein
X represents a chemical bond, an alkylene group, —SO$_2$—, —S—,

—O—, or —C—,
              ‖
              O

R$_4$ and R$_5$ each represents a group selected from an alkyl group, a benzyl group, a phenyl group, and derivatives thereof, R$_6$ and R$_7$ each represents a hydrogen atom, an alkyl group, or a halogen atom, and m and n each is an integer of 1 or more;

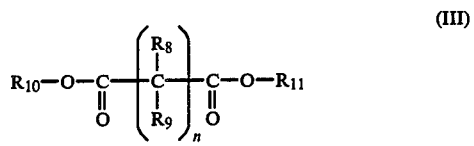

wherein

R$_8$ and R$_9$ each represents a group selected from a hydrogen atom, an alkyl group, a phenyl group, a benzyl group, and derivatives thereof, R$_{10}$ represents a group selected from a phenyl group, a benzyl group, and derivatives thereof, R$_{11}$ represents a group selected from a hydrogen atom, an alkyl group, and the groups defined for R$_{10}$, and n is an integer of 4 or more.

6. A polyester resin composition as in claim 1, wherein the inorganic compound having an average particle diameter of not more than 50 μm is at least one inorganic compound selected from the group consisting of talc, mica, kaolin, and silica.

7. A polyester resin composition as in claim 1, wherein the metal salt of a carboxyl group is the sodium or potassium salt of a carboxyl group.

8. A polyester resin composition as in claim 1, wherein the compound containing a metal salt of a carboxyl group is a fatty acid salt having from about 7 to 30 carbon atoms or an aromatic acid salt.

9. A polyester resin composition as in claim 1, wherein the polymer compound containing a carboxyl group is an olefin-acrylic acid or methacrylic acid copolymer or a styrene-acrylic acid or methacrylic acid copolymer.

10. A polyester resin composition as in claim 1, wherein said polyester is an ethylene terephthalate-based polyester (1) comprising from 10 to 20 wt% of said dibasic acid represented by formula (I).

11. A polyester resin composition as in claim 1, wherein said polyester is an ethylene terephthalate-based polyester (2) comprising from 10 to 20 wt% of said polyalkylene glycol.

12. A polyester resin composition as in claim 1, wherein component (b) is selected from the group consisting of an ethylene-propylene copolymer, an ethylene-butene-1 copolymer, an ethylene-vinyl acetate copolymer, an ethylene-propylene-butadiene copolymer, an ethylene-propylene-isoprene copolymer, and an ethylene-propylene-chloroprene copolymer.

13. A polyester resin composition as in claim 1, wherein the amount of alicyclic carboxylic acid is from 0.01 to 5.0 mol%.

14. A polyester resin composition as in claim 13, wherein the amount of alicyclic carboxylic acid is from 0.05 to 2.0 mol%.

15. A polyester resin composition as in claim 1, wherein component (c) comprises from 1 to 10 wt% of glycidyl methacrylate or glycidyl acrylate.

16. A polyester resin composition as in claim 1, wherein component (a) is present in an amount of from 0.1 to 5 parts by weight, component (b) is present in an amount of from 5 to 25 parts by weight, component (c) is present in an amount of from 3 to 20 parts by weight, component (d) is present in an amount of from 1 to 7 parts by weight.

17. A polyester resin composition as in claim 16, wherein component (a) is present in an amount of from 0.1 to 3 parts by weight, component (b) is present in an amount of from 5 to 20 parts by weight, and component (c) is present in an amount of from 3 to 15 parts by weight.

18. A polyester resin composition as in claim 3 wherein the bisphenol compound is 2,2-bis(4-hydroxyphenyl)propane.

* * * * *